United States Patent
Kotra et al.

(10) Patent No.: US 12,287,739 B2
(45) Date of Patent: Apr. 29, 2025

(54) ACCESSING A CACHE BASED ON AN ADDRESS TRANSLATION BUFFER RESULT

(71) Applicant: Advanced Micro Devices, Inc., Santa Clara, CA (US)

(72) Inventors: Jagadish B Kotra, Austin, TX (US); John Kalamatianos, Arlington, MA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 18/064,155

(22) Filed: Dec. 9, 2022

(65) Prior Publication Data
US 2024/0193097 A1 Jun. 13, 2024

(51) Int. Cl.
G06F 12/1045 (2016.01)
G06F 12/0888 (2016.01)
G06F 12/0897 (2016.01)
G06F 12/1027 (2016.01)

(52) U.S. Cl.
CPC ...... G06F 12/1045 (2013.01); G06F 12/0888 (2013.01); G06F 12/0897 (2013.01); G06F 12/1027 (2013.01)

(58) Field of Classification Search
None
See application file for complete search history.

(56) References Cited

U.S. PATENT DOCUMENTS

| | | | | |
|---|---|---|---|---|
| 7,984,263 | B2* | 7/2011 | Sathaye | G06F 12/10 711/138 |
| 2004/0078790 | A1* | 4/2004 | Wu | G06F 9/30043 711/E12.021 |
| 2006/0224857 | A1* | 10/2006 | O'Connor | G06F 12/126 711/E12.075 |
| 2007/0094476 | A1* | 4/2007 | Augsburg | G06F 12/1027 711/207 |

(Continued)

OTHER PUBLICATIONS

Baniasadi, Amirali, et al., "Asymmetric-frequency clustering: a power-aware back-end for high-performance processors", ISLPED '02: Proceedings of the 2002 international symposium on Low power electronics and design [retrieved Jul. 6, 2022]. Retrieved from the Internet <https://www.eecg.utoronto.ca/~moshovos/research/islped02.pdf>., Aug. 12, 2002, 4 Pages.

(Continued)

*Primary Examiner* — Kaushikkumar M Patel
(74) *Attorney, Agent, or Firm* — FIG. 1 Patents

(57) ABSTRACT

Address translation is performed to translate a virtual address targeted by a memory request (e.g., a load or memory request for data or an instruction) to a physical address. This translation is performed using an address translation buffer, e.g., a translation lookaside buffer (TLB). One or more actions are taken to reduce data access latencies for memory requests in the event of a TLB miss where the virtual address to physical address translation is not in the TLB. Examples of actions that are performed in various implementations in response to a TLB miss include bypassing level 1 (L1) and level 2 (L2) caches in the memory (Continued)

system, and speculatively sending the memory request to the L2 cache while checking whether the memory request is satisfied by the L1 cache.

20 Claims, 6 Drawing Sheets

(56) References Cited

U.S. PATENT DOCUMENTS

| | | | |
|---|---|---|---|
| 2009/0182944 A1* | 7/2009 | Comparan | G06F 12/0888 711/146 |
| 2009/0216947 A1* | 8/2009 | Bohn | G06F 12/1027 711/E12.024 |
| 2013/0111132 A1* | 5/2013 | Zheng | G06F 12/1054 711/119 |
| 2013/0246708 A1* | 9/2013 | Ono | G06F 12/0862 711/E12.024 |
| 2015/0205724 A1* | 7/2015 | Hancock | G06F 12/1027 711/129 |
| 2017/0286151 A1* | 10/2017 | Landers | G06F 12/0891 |

OTHER PUBLICATIONS

Calder, Brad , "Selective value prediction", ISCA '99: Proceedings of the 26th annual international symposium on Computer architecture [retrieved Jul. 6, 2022]. Retrieved from the Internet <https://www.eecg.utoronto.ca/~moshovos/ACA07/projectsuggestions/00765940.pdf>., May 1999, 11 Pages.

Fields, Brian , et al., "Focusing Processor Policies via Critical-Path Prediction", 28th Annual International Symposium on Computer Architecture [retrieved Jul. 6, 2022]. Retrieved from the Internet <https://web.archive.org/web/20040328123955id_/http://www.cs.berkeley.edu:80/~bodik/research/isca01a.pdf>., Aug. 7, 2001, 12 Pages.

Fields, B. , et al., "Slack: maximizing performance under technological constraints", Proceedings 29th Annual International Symposium on Computer Architecture [retrieved Jul. 6, 2022]. Retrieved from the Internet <https://www.ece.lsu.edu/tca/papers/fields02slack.pdf>., May 2002, 12 Pages.

Fisk, B.R. , et al., "The non-critical buffer: using load latency tolerance to improve data cache efficiency", IEEE International Conference on Computer Design: VLSI in Computers and Processors [retrieved Jul. 6, 2022]. Retrieved from the Internet <https://web.archive.org/web/20051016041042id_/http://www.iccd-conference.org:80/proceedings/1999/04060538.pdf>., Oct. 1999, 8 Pages.

Kotra, Jagadish B, et al., "Re-NUCA: A Practical NUCA Architecture for ReRAM based last-level caches", IEEE International Parallel and Distributed Processing Symposium [retrieved Jul. 6, 2022]. Retrieved from the Internet <https://www.cse.psu.edu/hpcl/docs/2016_IPDPS_Jagadish.pdf>., May 2016, 10 Pages.

Loh, Gabriel H, et al., "Efficiently enabling conventional block sizes for very large die-stacked DRAM caches", MICRO-44: Proceedings of the 44th Annual IEEE/ACM International Symposium on Microarchitecture [retrieved Jul. 6, 2022]. Retrieved from the Internet <https://research.cs.wisc.edu/multifacet/papers/micro11_missmap.pdf>., Dec. 3, 2011, 11 Pages.

Salverda, P. , et al., "A criticality analysis of clustering in superscalar processors", IEEE/ACM International Symposium on Microarchitecture [retrieved Jul. 6, 2022]. Retrieved from the Internet <http://zilles.cs.illinois.edu/papers/clustering.micro2005.pdf>., Nov. 2005, 12 Pages.

Sembrant, Andreas , et al., "Navigating the cache hierarchy with a single lookup", ACM/IEEE 41st International Symposium on Computer Architecture [retrieved Dec. 8, 2022]. Retrieved from the Internet <10.1109/ISCA.2014.6853203>., Jun. 2014, 12 Pages.

Seng, J.S. , et al., "Reducing power with dynamic critical path information", 34th ACM/IEEE International Symposium on Microarchitecture [retrieved Jul. 6, 2022]. Retrieved from the Internet <https://cseweb.ucsd.edu//~tullsen/cppower.pdf>., Dec. 2001, 10 Pages.

Sim, Jaewoong , et al., "A Mostly-Clean DRAM Cache for Effective Hit Speculation and Self-Balancing Dispatch", EEE/ACM International Symposium on Microarchitecture [retrieved Jul. 6, 2022]. Retrieved from the Internet <https://iaewoong.org/pubs/sim_micro12.pdf>., Dec. 2012, 11 Pages.

Subramaniam, Samantika , et al., "Criticality-based optimizations for efficient load processing", IEEE 15th International Symposium on High Performance Computer Architecture [retrieved Jul. 6, 2022]. Retrieved from the Internet <https://web.archive.org/web/20170426122232id_/http://www.cs.cornell.edu/~bracy/resources/pubs/hpca2009-lcp.pdf>., Feb. 2009, 12 Pages.

Tune, Eric , et al., "Dynamic prediction of critical path instructions", HPCA '01: Proceedings of the 7th International Symposium on High-Performance Computer Architecture [retrieved Jul. 6, 2022]. Retrieved from the Internet <https://cseweb.ucsd.edu/~tullsen/hpca00.pdf>., Jan. 20, 2002, 11 Pages.

Ye, Huaisheng , "Introduction to 5-Level Paging in 3rd Gen Intel Xeon Scalable Processors with Linux", Lenovo Press, Lenovo [retrieved Jul. 6, 2022]. Retrieved from the Internet <https://lenovopress.lenovo.com/lp1468.pdf>., 12 Pages.

* cited by examiner

ACCESSING A CACHE BASED ON AN ADDRESS TRANSLATION BUFFER RESULT

GOVERNMENT LICENSE RIGHTS

This invention was made with government support under contract number H98230-21-3-0001 awarded by the Department of Defense. The government has certain rights in the invention.

BACKGROUND

Many computing devices have a memory system that includes a main memory and a cache, which is typically smaller but faster than the main memory. When a memory request is made, the device attempts to satisfy the request using the cache. If the attempt to satisfy the request using the cache fails, the device satisfies the request using the main memory.

BRIEF DESCRIPTION OF THE DRAWINGS

The detailed description is described with reference to the accompanying figures. Entities represented in the figures are indicative of one or more entities and thus reference is made interchangeably to single or plural forms of the entities in the discussion.

DETAILED DESCRIPTION

Overview

Figure 1:
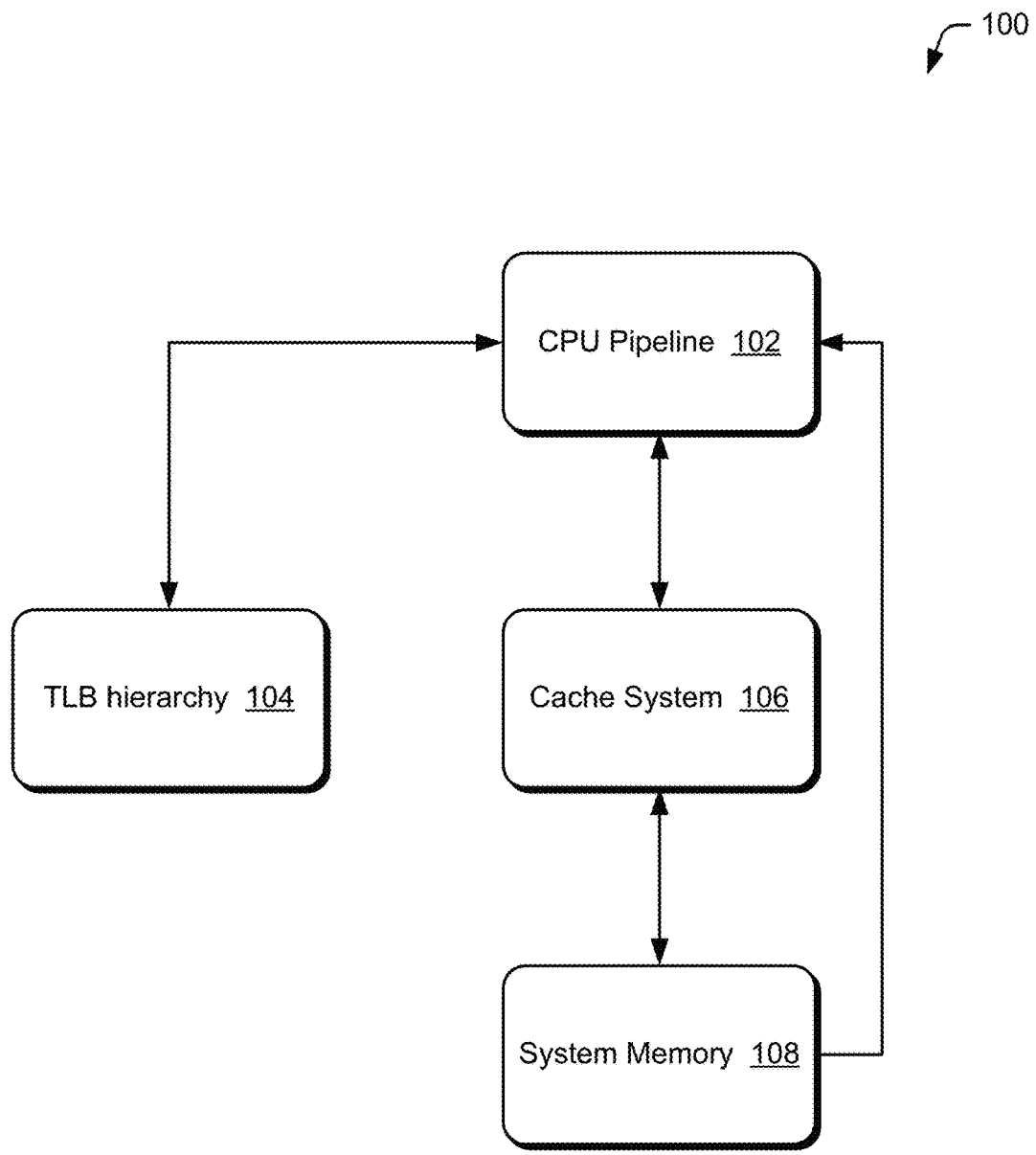
FIG. 1 is an illustration of a non-limiting example system that is operable to employ the accessing a cache based on an address translation buffer result described herein.

Many computer memory systems include a main memory and a cache, which is typically a smaller but faster memory than the main memory. Memory requests (e.g., load and store memory requests) that are satisfied by the cache typically have lower latency than memory requests satisfied by the main memory. However, not all requests are satisfied by a cache because the requested data or instruction is not available in the cache, which is referred to as a cache miss. A cache miss increases the latency for satisfying the request because time is expended checking whether the request is satisfiable by the cache only to find out that the request is not satisfiable by the cache.

The techniques discussed herein perform address translation to translate a virtual address targeted by a memory request (e.g., a load or memory request for data or an instruction) to a physical address. This translation is performed using an address translation buffer, typically referred to as a translation lookaside buffer (TLB). The TLB stores recent translations, allowing the translation to be returned more quickly. One or more actions are taken to reduce data access latencies for memory requests in situations where the virtual address to physical address translation is not in the TLB, which is typically referred to as a TLB miss. Examples of actions that are performed in various implementations in response to a TLB miss include bypassing level 1 (L1) and level 2 (L2) caches in the memory system, and speculatively sending the memory request to the L2 cache while checking whether the memory request is satisfied by the L1 cache.

The techniques discussed herein take advantage of an observation that the data or instruction to satisfy a memory request that results in a TLB miss is typically not in the cache (e.g., not in the L1 or the L2 cache). Accordingly, taking one or more of the actions discussed above in response to a TLB miss reduces data access latencies as well as energy expenditures for memory requests (e.g., load and store memory requests for data or instructions). For example, if the L1 and L2 caches are bypassed in response to a TLB miss for memory requests, the data access latency (as well as energy expenditure) for the majority of memory requests when there is a TLB miss is reduced because time and power is not expended checking whether the request is satisfied by the L1 or L2 cache only to find out that the request cannot be satisfied by the L1 or L2 cache. By way of another example, if memory requests are speculatively sent to the L2 cache while checking whether the memory request is satisfied by the L1 cache, the data access latency for the majority of memory requests when there is a TLB miss is reduced because whether the memory request is satisfied by the L2 cache is checked without waiting to determine whether the memory request is satisfied by the L1 cache.

Furthermore, the techniques discussed herein expedite the execution of other instructions because resources of the caches are not being expended. For example, if a memory request is bypassing the L1 and L2 caches, the bandwidth used to access the L1 and L2 caches is usable for other requests (e.g., that resulted in TLB hits) and need not be expended on the requests that are unlikely to be satisfied by the L1 and L2 caches (e.g., the requests that are bypassing the L1 and L2 caches).

In some aspects, the techniques described herein relate to a method including: receiving a memory request targeting a virtual address, translating the virtual address to a physical address, and accessing a cache based on whether the translation resulted in a translation lookaside buffer miss.

In some aspects, the techniques described herein relate to a method, wherein the accessing includes bypassing, in response to the translation resulting in the translation lookaside buffer miss, the cache when retrieving data or an instruction from the physical address or storing the data or the instruction to the physical address.

In some aspects, the techniques described herein relate to a method, wherein the cache includes a level 1 cache and the accessing further includes bypassing, in response to the translation resulting in the translation lookaside buffer miss, a level 2 cache when retrieving the data or the instruction from the physical address or storing the data or the instruction to the physical address.

In some aspects, the techniques described herein relate to a method, wherein the accessing further includes bypassing, in response to the translation resulting in the translation lookaside buffer miss, a level 3 cache when retrieving the data or the instruction from the physical address or storing the data or the instruction to the physical address.

In some aspects, the techniques described herein relate to a method, wherein the cache includes a level 1 cache and the accessing includes, in response to the translation lookaside buffer miss: checking whether an instruction or data corresponding to the memory request is stored in the level 1 cache, and speculatively sending the memory request to a level 2 cache.

In some aspects, the techniques described herein relate to a method, further including: transmitting, to a cache controller corresponding to the cache and in response to the translation resulting in the translation lookaside buffer miss, a memory request having a long-latency bit set to indicate to bypass the cache.

In some aspects, the techniques described herein relate to a device, including: a cache, a translation lookaside buffer hierarchy to translate a virtual address targeted by a memory request to a physical address, the translation lookaside buffer hierarchy including at least one translation lookaside buffer, and a cache controller, coupled to the cache and the translation lookaside buffer hierarchy, to receive the memory request and access the cache based on whether the virtual address resulted in a translation lookaside buffer miss in the translation lookaside buffer hierarchy.

In some aspects, the techniques described herein relate to a device, wherein to access the cache includes to bypass, in response to the translation lookaside buffer miss, the cache when retrieving data or an instruction from the physical address or storing the data or the instruction to the physical address.

In some aspects, the techniques described herein relate to a device, wherein the cache includes a level 1 cache and wherein to access the cache includes to bypass, in response to the translation lookaside buffer miss, a level 2 cache when retrieving the data or the instruction from the physical address or storing the data or the instruction to the physical address.

In some aspects, the techniques described herein relate to a device, wherein to access the cache includes to bypass, in response to the translation lookaside buffer miss, a level 3 cache when retrieving the data or the instruction from the physical address or storing the data or the instruction to the physical address.

In some aspects, the techniques described herein relate to a device, wherein the cache includes a level 1 cache and wherein to access the cache includes to, in response to the translation lookaside buffer miss: check whether an instruction or data corresponding to the memory request is stored in the level 1 cache, and speculatively send the memory request to a level 2 cache.

In some aspects, the techniques described herein relate to a device, wherein the memory request includes a long-latency bit set to indicate to bypass the cache.

In some aspects, the techniques described herein relate to a device, wherein the device includes a computing device, and the computing device further includes a system memory.

In some aspects, the techniques described herein relate to a device, including: a translation lookaside buffer hierarchy, including at least one translation lookaside buffer, to translate a virtual address targeted by a memory request to a physical address, and a cache system, including at least one cache, to receive the memory request and access the cache based on whether the virtual address resulted in a translation lookaside buffer miss in the translation lookaside buffer hierarchy.

In some aspects, the techniques described herein relate to a device, wherein to access the cache includes to bypass, in response to the translation lookaside buffer miss, the cache when retrieving data or an instruction from the physical address or storing the data or the instruction to the physical address.

In some aspects, the techniques described herein relate to a device, wherein the cache includes a level 1 cache and wherein to access the cache includes to bypass, in response to the translation lookaside buffer miss, a level 2 cache when retrieving the data or the instruction from the physical address or storing the data or the instruction to the physical address.

In some aspects, the techniques described herein relate to a device, wherein to access the cache includes to bypass, in response to the translation lookaside buffer miss, a level 3 cache when retrieving the data or the instruction from the physical address or storing the data or the instruction to the physical address.

In some aspects, the techniques described herein relate to a device, wherein the cache includes a level 1 cache and wherein to access the cache includes to, in response to the translation lookaside buffer miss: check whether an instruction or data corresponding to the memory request is stored in the level 1 cache, and speculatively send the memory request to a level 2 cache.

In some aspects, the techniques described herein relate to a device, wherein the cache includes a level 2 cache and wherein to access the cache includes to, in response to the translation lookaside buffer miss: check whether an instruction or data corresponding to the memory request is stored in the level 2 cache, and speculatively send the memory request to a level 3 cache.

In some aspects, the techniques described herein relate to a device, wherein the memory request includes a long-latency bit set to indicate to bypass the cache.

FIG. 1 is an illustration of a non-limiting example system 100 that is operable to employ the accessing a cache based on an address translation buffer result described herein. The system 100 includes various components including a central processing unit (CPU) pipeline 102, a TLB hierarchy 104, a cache system 106, and a system memory 108. The system 100 supports virtual memory, which refers to programs running in the system 100 being allocated a range of virtual memory in a virtual memory space. The system 100 maps virtual addresses that are in the virtual memory space to physical addresses in the physical memory (e.g., system memory 108). The system 100 also transfers data stored in portions (also referred to as pages) of physical memory to and from a storage device (not shown), such as a hard drive or solid-state drive, as needed, a process oftentimes referred to as paging.

The CPU pipeline 102 includes one or more of various components of a processor core that issue memory requests, such as read requests and store requests. Examples of such components include an arithmetic logic unit (ALU), a control unit (CU), a load-store unit (LSU), and so forth. The TLB hierarchy 104 includes at least one TLB and a module or controller that translates virtual address to physical addresses in the event of a TLB miss, a process oftentimes referred to as a page walk.

The cache system 106 includes at least one cache. Each cache is memory that is typically faster than the system memory 108. Each cache is, for example, an instruction cache, a data cache, or a combination thereof (e.g., a unified cache). In one or more implementations, the system memory 108 is any of a variety of volatile memory, such as dynamic random access memory (DRAM). Additionally or alternatively, the system memory 108 is any of a variety of nonvolatile memory, such as resistive random access memory (e.g., memristors).

The system 100 is implementable in any of a variety of different types of computing devices that include or use virtual memory. For example, the system 100 is implementable in a smartphone or other wireless phone, a tablet or phablet computer, a notebook computer (e.g., netbook or ultrabook), a laptop computer, a wearable device (e.g., a smartwatch, an augmented reality headset or device, a virtual reality headset or device), an entertainment device (e.g., a gaming console, a portable gaming device, a streaming media player, a digital video recorder, a music or other audio playback device, a television), an Internet of Things (IoT) device, an automotive computer, and so forth.

Figure 2:
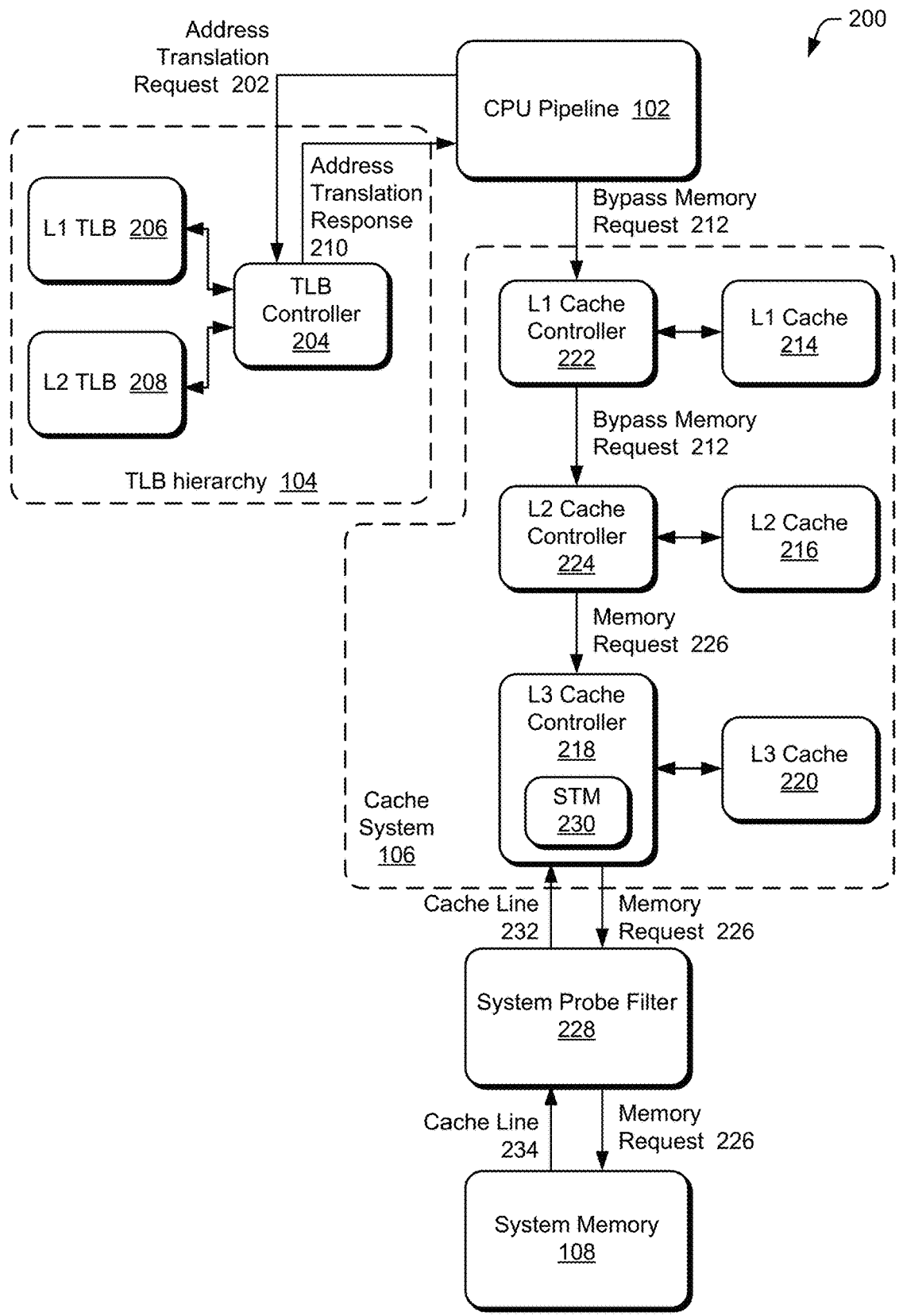
FIG. 2 is an illustration of operation of an example system in the event of a translation lookaside buffer miss.

FIG. 2 is an illustration of operation of an example system 200 in the event of a TLB miss. The system 200 is an example of the system 100 of FIG. 1, and includes the CPU pipeline 102, the TLB hierarchy 104, the cache system 106, and the system memory 108. The CPU pipeline 102 issues memory requests, such as load requests (also referred to as load instructions) to read data or instructions from memory and store requests (also referred to as store instructions) to store or save data or instructions to memory. A memory request targets a virtual address and the CPU pipeline 102 issues an address translation request 202 to the TLB hierarchy 104.

The TLB hierarchy 104 includes a TLB controller 204 that receives the address translation request 202, which includes the virtual address targeted by the memory request that the CPU pipeline 102 is going to issue. The TLB controller 204 accesses one or both of an L1 TLB 206 and an L2 TLB 208. In one or more implementations, the L1 TLB 206 is a smaller but faster memory than the L2 TLB 208. The TLB controller 204 returns an address translation response 210 to the CPU pipeline 102 that is dependent on whether a translation for the virtual address received in the address translation request 202 is available in the L1 TLB 206 or the L2 TLB 208. If the virtual address is available in the L1 TLB 206 or the L2 TLB 208, also referred to as a TLB hit, then the TLB controller 204 returns an indication of a TLB hit and the physical address, from the L1 TLB 206 or the L2 TLB 208, that corresponds to the virtual address. If the virtual address is not available in the L1 TLB 206 or the L2 TLB 208, also referred to as a TLB miss, then the TLB controller 204 performs a page walk to convert the virtual address to a physical address. The TLB controller 204 then an indication of a TLB miss as well as the physical address obtained via the page walk.

The CPU pipeline 102 issues a bypass memory request 212 that targets the physical address obtained from the TLB hierarchy 104. The bypass memory request 212 is similar to a conventional memory request but differs in that the bypass memory request 212 includes an indication of whether to bypass at least one cache in the cache system 106. Bypassing a cache refers to no check being made as to whether the data or instruction at the physical address is stored in the cache (e.g., and thus no check as to whether the memory request is satisfiable by the cache). In one or more implementations, the indication is a bit, e.g., referred to as a long-latency bit. The CPU pipeline 102 indicates to bypass at least one cache (e.g., sets the long-latency bit to one value, such as "1") if the address translation request 202 resulted in a TLB miss (e.g., the TLB hierarchy 104 incurred a page walk). However, the CPU pipeline 102 indicates to not bypass any cache (e.g., sets the long-latency bit to another value, such as "0") if the address translation request 202 resulted in a TLB hit (e.g., the TLB hierarchy 104 did not incur a page walk). Although examples are discussed herein with reference to the long-latency bit, it is to be appreciated that the indication of whether to bypass at least one cache in the cache system 106 is implementable in any of a variety of manners using different bits, instructions, signaling, and so forth.

In the example system 200, the bypass memory request 212 bypasses an L1 cache 214 and an L2 cache 216, and the memory request is received by an L3 cache controller 218. The L3 cache controller 218 operates in a conventional manner to check whether the requested data or instruction is stored in an L3 cache 220. The cache system 106 is implementable in any of a variety of different manners to bypass the L1 cache 214 and the L2 cache 216. It should be noted that although each cache is illustrated in the example system 200 as having a corresponding cache controller, additionally or alternatively, a single cache controller controls multiple caches.

Each bypass memory request will allocate a miss status handling register (MSHR) at the L1 and L2 levels (e.g., one MSHR per cache level being bypassed) without entering the L1 cache controller 222 or the L2 cache controller 224 to perform a tag lookup. The MSHRs are allocated to allow checking for whether a cache miss to the same block is already pending and avoid generating a new request if a cache miss to the same block is already pending. In one or more implementations, the MSHRs are allocated by the CPU pipeline 102 (e.g., an LSU). Additionally or alternatively, the MSHRs are allocated by another component or module, such as the L1 cache controller 222 and the L2 cache controller 224.

In one or more implementations, an L1 cache controller 222 receives the bypass memory request 212, and in response sends the bypass memory request 212 to an L2 cache controller 224. The L1 cache controller 222 makes no check as to whether the requested data or instruction is in the L1 cache 214. The L1 cache controller 222 is able to replay (e.g., forward to the L2 cache controller 224) the bypass memory request 212 without scheduling it on the L1 cache 214 pipeline as the bypass memory request 212 has reserved an MSHR due to the TLB miss.

The L2 cache controller 224 receives the bypass memory request 212 from the L1 cache controller 222 and in response sends a memory request 226 to the L3 cache controller 218. The L2 cache controller 224 makes no check as to whether the requested data or instruction is in the L2 cache 216. The L2 cache controller 224 is able to forward the memory request 226 to the L3 cache controller 218 without scheduling it on the L2 cache 216 pipeline as the bypass memory request 212 has reserved an MSHR due to the TLB miss. The memory request 226 is, for example, the same as the bypass memory request 212 except that the long-latency bit in the memory request 226 is not set. E.g., the L2 cache controller 224 clears the long-latency bit in the bypass memory request 212 before forwarding the memory request 226 to the L3 cache controller 218. Additionally or alternatively, the long-latency bit is not cleared but is ignored by later controllers or modules involved in satisfying the memory request (e.g., the L3 cache controller 218, the system memory 108, a system probe filter (SPF) 228, and so forth).

Once the memory request 226 is received at the L3 cache controller 218, the system 200 operates in a conventional manner to satisfy the memory request 226. The L3 shadow tag macro (STM) 230 is looked up in parallel to the L3 cache 220 lookup, to determine whether a cache line corresponding to the physical address is present in the private L1 or L2 cache of another core of the same core complex die (CCD).

If the STM 230 lookup and the L3 lookup indicate that the cache line corresponding to the physical address is not present in the private L1 or L2 cache of another core (e.g., an STM miss), the L3 cache controller 218 forwards the memory request 226 to the SPF 228 to determine whether the cache line corresponding to the physical address is present in some other CCD. If the cache line corresponding to the physical address is present in some other CCD (an SPF hit), the SPF 228 obtains the cache line from the other CCD and returns the cache line 232 to the L3 cache controller 218. If the cache line corresponding to the physical address is not present in some other CCD (an SPF miss), the SPF 228 sends the memory request 226 to the system memory 108, which returns the cache line 234 to the SPF 228, which in turn returns the cache line (e.g., illustrated as cache line 232) to the L3 cache controller 218. In one or more implementations, the SPF 228 sends the memory request 226 to the system memory 108 speculatively while waiting to determine whether or not the cache line corresponding to the physical address is present in some other CCD (e.g., whether there is an SPF hit or an SPF miss).

Returning to the STM 230, if the STM 230 lookup indicates that the cache line corresponding to the physical address is present in the private L1 or L2 cache of the same core (e.g., an STM hit), then the cache line corresponding to the physical address is present in the L2 cache 216. Accordingly, the STM 230 sends an STM hit to the L3 cache controller 218. In response to the STM hit, the cache controller 218 deallocates the L3 MSHR for the memory request and issues an L2 cache 216 lookup, just as if the memory request received from the L1 cache controller did not indicate to bypass the L2 cache 216. If the cache line resides in the L1 cache 214, then the request is sent back to the L1 cache controller 222 to wake up the memory request while at the same time the L1 cache controller 222 and the L2 cache controller 224 free the L1 and L2 MSHRs, respectively.

If the STM 230 lookup indicates that the cache line corresponding to the physical address is present in the L2 cache of another core, then the flow is the same as if there were an L2 miss but the cache line corresponding to the physical address is present in the L2 cache of the same CCD.

In the examples above, reference is made to the bypass memory request 212 being sent to the L1 cache controller 222 and the L2 cache controller 224. Additionally or alternatively, the bypass memory request 212 is sent to neither the L1 cache controller 222 nor the L2 cache controller 224, and is sent by the CPU pipeline 102 (e.g., an LSU) directly to the L3 cache controller 218.

The operation of example system 200 illustrates a TLB miss. Although not illustrated in system 200, in the event of a TLB hit the system 200 operates in a conventional manner. The long-latency bit of the memory request issued by the CPU pipeline 102 indicates to not bypass any cache, and the L1 cache is checked to see if the memory request is satisfiable by the L1 cache, and the L2 cache (if the memory request is not satisfiable by the L1 cache) is checked to see if the memory request is satisfiable by the L2 cache.

It should be noted that system 200 is only an example and in one or more implementations all components illustrated in FIG. 2 need not be included in the system 200. For example, if there are no other cores on the CCD, then the STM 230 need not be included in the system 200. By way of another example, if there are no other CCDs, then the SPF 228 need not be included in the system 200. By way of another example, if the cache system 106 only one cache level, then the bypass memory request would bypass that cache level and the memory request would be sent directly to the system memory 108.

Figure 3:
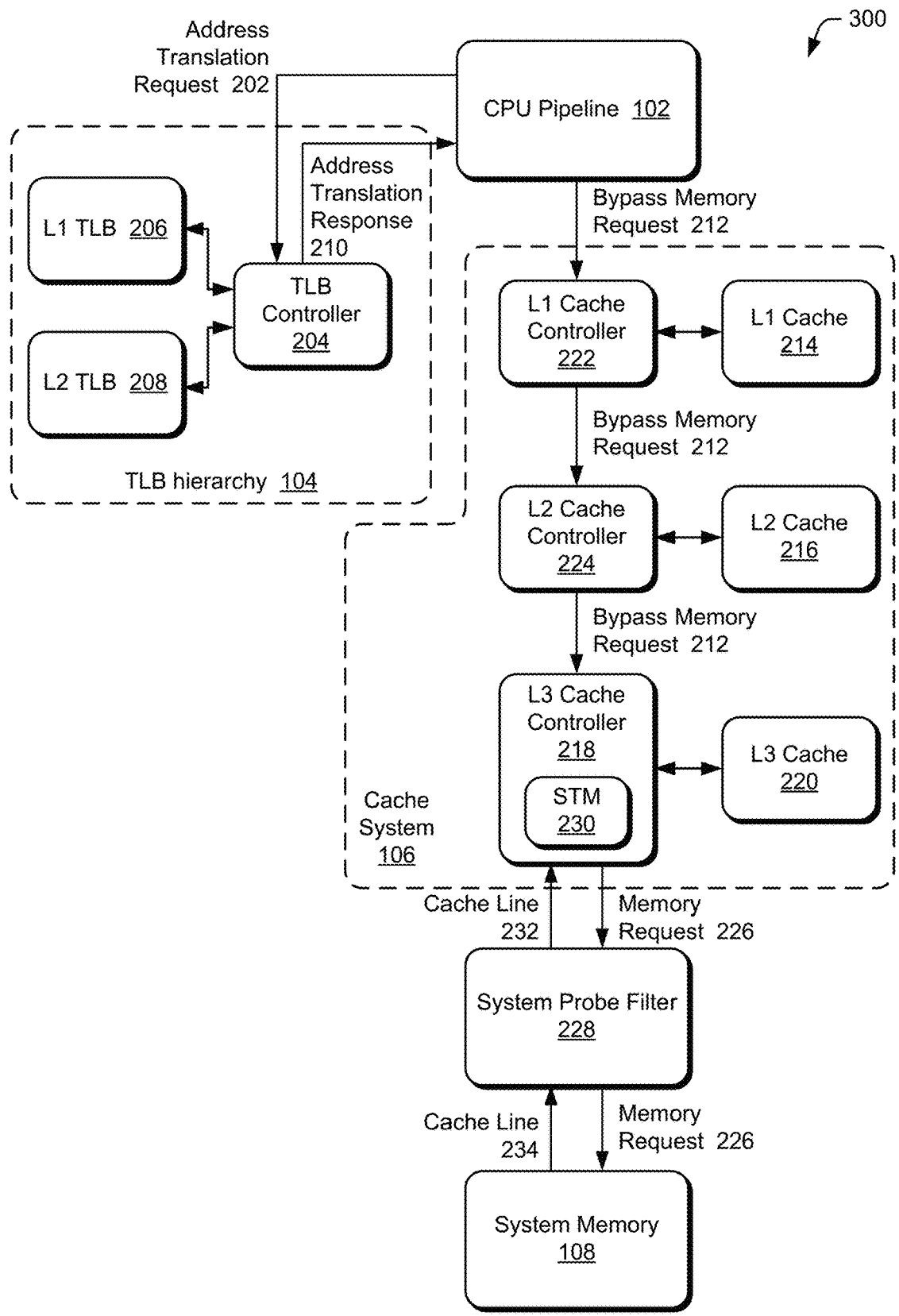
FIG. 3 is an illustration of operation of another example system in the event of a translation lookaside buffer miss.

FIG. 3 is an illustration of operation of an example system 300 in the event of a TLB miss. The system 300 is an example of the system 100 of FIG. 1, and includes the CPU pipeline 102, the TLB hierarchy 104, the cache system 106, and the system memory 108. The operation of the example system 300 is analogous to the operation of the example system 200 of FIG. 3, except that the operation of the example system 300 differs in that the L3 cache level is also bypassed.

In one or more implementations, the L3 cache controller 218 receives the bypass memory request 212, and in response sends the memory request 226 to the SPF 228. The L3 cache controller 218 makes no check as to whether the requested data or instruction is in the L3 cache 220. The L3 cache controller 218 is able to replay (e.g., forward to the SPF 228) the memory request 226 without scheduling it on the L3 cache 220 pipeline as the bypass memory request 212 has reserved an MSHR at the L3 level due to the TLB miss.

Although the L3 cache controller 218 makes no check as to whether the requested data or instruction is in the L3 cache 220, the STM 230 lookup is still performed as discussed above with respect to the example system 200.

Figure 4:
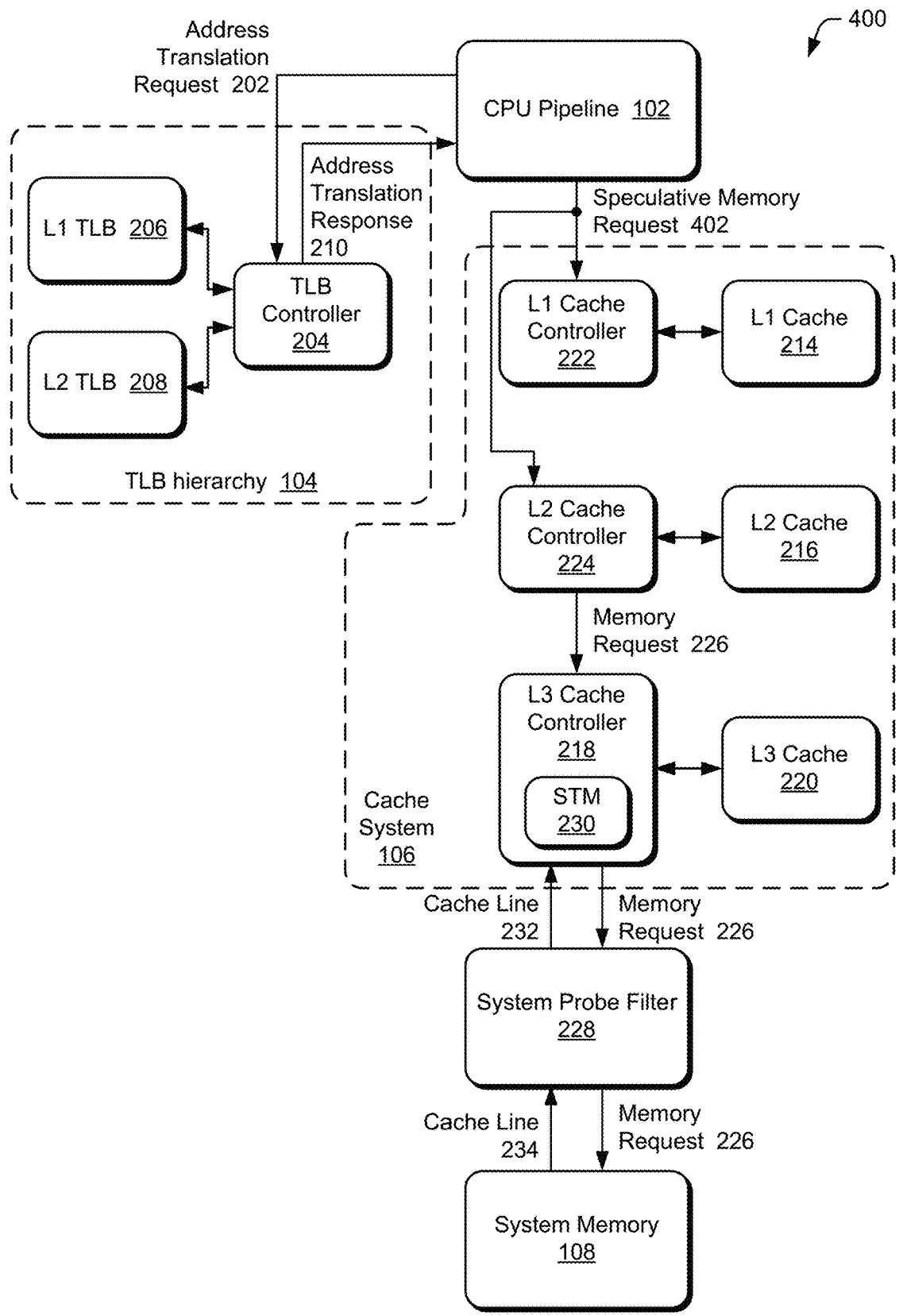
FIG. 4 is an illustration of operation of another example system in the event of a translation lookaside buffer miss.

FIG. 4 is an illustration of operation of an example system 400 in the event of a TLB miss. The system 400 is an example of the system 100 of FIG. 1, and includes the CPU pipeline 102, the TLB hierarchy 104, the cache system 106, and the system memory 108. The operation of the example system 400 is analogous to the operation of the example system 200 of FIG. 2, except that the operation of the example system 400 differs in that memory requests are speculatively sent to the next level cache rather than bypassing the current level cache.

As cache levels are not bypassed in the operation of example system 400, MSHRs are not allocated in response to a TLB hit for cache levels that are bypassed. Rather, a cache level is checked while the memory request is speculatively sent to the next cache level. At each cache level, if the data or instruction corresponding to the physical address is not included in the cache, an MSHR is allocated for that level.

The CPU pipeline 102 issues a speculative memory request 402 that targets the physical address obtained from the TLB hierarchy 104. The speculative memory request 402 is similar to a conventional memory request but differs in that the speculative memory request 402 includes an indication of whether to speculatively access at least one cache in the cache system 106. Speculatively accessing a cache refers to speculatively sending the request to the next cache level as the cache is being checked to see whether the requested data or instruction is satisfied by the cache. In one or more implementations, the indication is a bit, e.g., a long-latency bit. The CPU pipeline 102 indicates to speculatively access at least one cache (e.g., sets the long-latency bit to one value, such as "1") if the address translation request 202 resulted in a TLB miss (e.g., the TLB hierarchy 104 incurred a page walk). However, the CPU pipeline 102 indicates to not speculatively access at least one cache (e.g., sets the long-latency bit to another value, such as "0") if the address translation request 202 resulted in a TLB hit (e.g., the TLB hierarchy 104 did not incur a page walk). Although examples are discussed herein with reference to the long-latency bit, it is to be appreciated that the indication of whether to speculatively access at least one cache in the cache system 106 is implementable in any of a variety of manners using different bits, instructions, signaling, and so forth.

In one or more implementations, the L1 cache controller 222 and the L2 cache controller 224 receive the speculative memory request 402 from the CPU pipeline 102. The request remains in the L1 cache controller 222 to complete a tag lookup in the L1 cache 214. If the data or instruction corresponding to the physical address is not included in the L1 cache 214 (e.g., a cache miss), an MSHR is allocated for L1. If the speculation is incorrect and the data or instruction corresponding to the physical address is included in the L1 cache 214 (e.g., a cache hit), then the memory request is satisfied by the L1 cache 214 (e.g., for a load request, data or instruction is returned back to the CPU pipeline 102) and the speculative requests issued to higher-level components (e.g., the L2 cache controller 224, the L3 cache controller 218, the SPF 228, the system memory 108) are cancelled. Additionally or alternatively, a separate cancel signal flows down the cache hierarchy to explicitly stop the speculative requests.

In one or more implementations, the L2 cache controller 224 receives the speculative memory request 402 from the CPU pipeline 102, and in response performs a tag lookup in the L2 cache 216. If the data or instruction corresponding to the physical address is not included in the L2 cache 216 (e.g., a cache miss), an MSHR is allocated for L2 and the L2 cache controller 224 sends a memory request 226 to the L3 cache controller 218. If the data or instruction corresponding to the physical address is included in the L2 cache 216 (e.g., a cache hit), then the memory request is satisfied by the L2 cache 216 (e.g., for a load request, data or instruction is returned back to the CPU pipeline 102). The memory request 226 is, for example, the same as the speculative memory request 402 except that the long-latency bit in the memory request 226 is not set. E.g., the L2 cache controller 224 clears the long-latency bit in the speculative memory request 402 before forwarding the memory request 226 to the L3 cache controller 218. Additionally or alternatively, the long-latency bit is not cleared but is ignored by later controllers or modules involved in satisfying the memory request (e.g., the L3 cache controller 218, the system memory 108, the SPF 228, and so forth).

Figure 5:
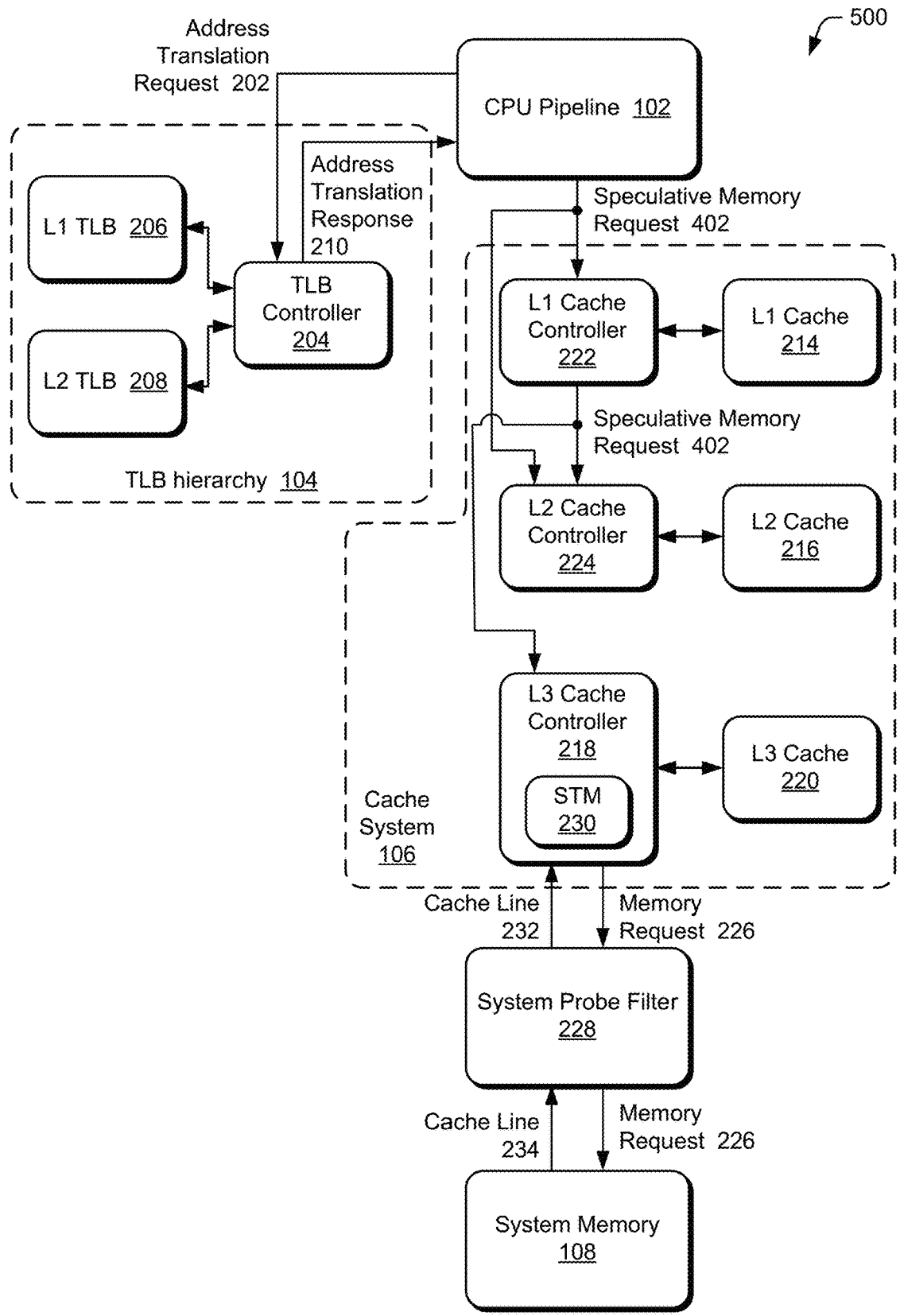
FIG. 5 is an illustration of operation of another example system in the event of a translation lookaside buffer miss.

FIG. 5 is an illustration of operation of an example system 500 in the event of a TLB miss. The system 500 is an example of the system 100 of FIG. 1, and includes the CPU pipeline 102, the TLB hierarchy 104, the cache system 106, and the system memory 108. The operation of the example system 500 is analogous to the operation of the example system 400 of FIG. 4, except that the operation of the example system 400 differs in that memory requests are speculatively sent to the L3 cache level as well.

In one or more implementations, the L2 cache controller 224 and the L3 cache controller 218 receive the speculative memory request 402 from the L1 cache controller 222. The request remains in the L2 cache controller 224 to complete a tag lookup in the L2 cache 216. If the data or instruction corresponding to the physical address is not included in the L2 cache 216 (e.g., a cache miss), an MSHR is allocated for L2. If the speculation is incorrect and the data or instruction corresponding to the physical address is included in the L2 cache 216 (e.g., a cache hit), then the memory request is satisfied by the L2 cache 216 (e.g., for a load request, data or instruction is returned back to the CPU pipeline 102) and the speculative requests issued to higher-level components (e.g., the L3 cache controller 218, the SPF 228, the system memory 108) are cancelled. Additionally or alternatively, a separate cancel signal flows down the cache hierarchy to explicitly stop the speculative requests.

In one or more implementations, the L3 cache controller 218 receives the speculative memory request 402 from the L1 cache controller 222, and in response performs a tag lookup in the L3 cache 220. If the data or instruction corresponding to the physical address is not included in the L3 cache 220 (e.g., a cache miss), an MSHR is allocated for L3 and the L3 cache controller 218 sends a memory request 226 to the SPF 228. If the data or instruction corresponding to the physical address is included in the L3 cache 220 (e.g., a cache hit), then the memory request is satisfied by the L3 cache 220 (e.g., for a load request, data or instruction is returned back to the CPU pipeline 102) and any speculative requests issued to higher-level components (e.g., the SPF 228 or the system memory 108) are cancelled. Additionally or alternatively, a separate cancel signal flows down the cache hierarchy to explicitly stop the speculative requests.

The memory request 226 is, for example, the same as the speculative memory request 402 except that the long-latency bit in the memory request 226 is not set. E.g., the L3 cache controller 218 clears the long-latency bit in the speculative memory request 402 before forwarding the memory request 226 to the L3 cache controller 218. Additionally or alternatively, the long-latency bit is not cleared but is ignored by later controllers or modules involved in satisfying the memory request (e.g., the L3 cache controller 218, the system memory 108, the SPF 228, and so forth).

Returning to FIG. 1, the discussions herein include examples of bypassing one or more caches (e.g., one or more cache levels) or speculatively accessing one or more caches (e.g., one or more cache levels). Which caches to bypass or speculatively access is determined in any of a variety of different manners. In one or more implementations, a cache is bypassed or speculatively accessed if there is less than a threshold chance (e.g., 5% or 10%) that the data or instruction will be in that cache if there was a TLB miss. The chances of the data or instruction being in a cache if there was a TLB miss is determined in various manners, such as empirically.

Additionally or alternatively, a cache is bypassed or speculatively accessed based on the size of pages that the address translations correspond to. If the address translations correspond to small page sizes (e.g., 4 kilobytes (kB)), then the data or instructions stored at the translated physical addresses are less likely to be in lower level caches (e.g., the L1 cache or the L2 cache), but are more likely to be in higher level caches (e.g., the L3 cache or an L4 cache). However, if the address translations correspond to large page sizes (e.g., 2 megabyte (MB) or 1 gigabyte (GB)), then the data or instructions stored at the translated physical addresses are less likely to be in lower level caches (e.g., the L1 cache or the L2 cache) as well as in higher level caches (e.g., the L3 cache or an L4 cache). Accordingly, in one or more implementations fewer caches are bypassed or speculatively accessed for smaller page sizes, and more caches are bypassed or speculatively accessed for larger page sizes.

Figure 6:
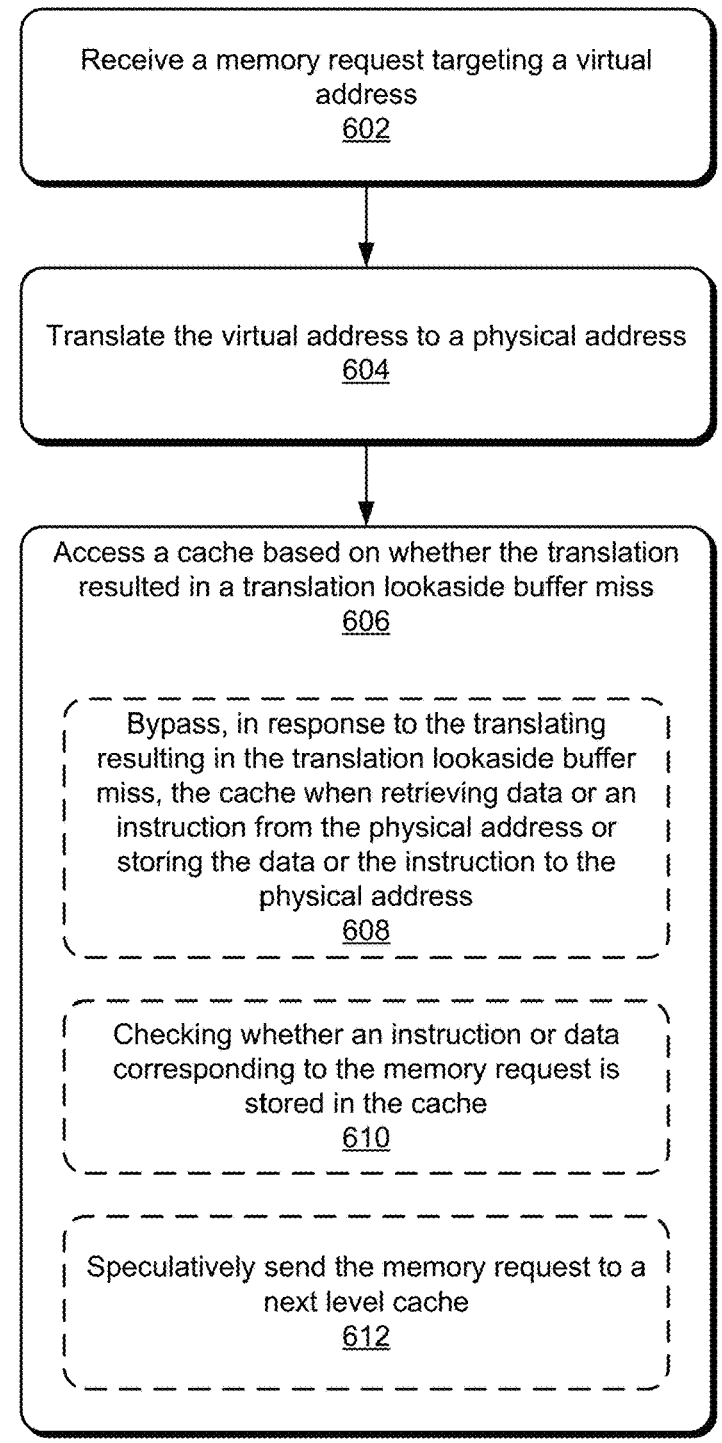
FIG. 6 is a flow diagram depicting a procedure in an example implementation of identifying memory system sensitivity to timing parameters.

FIG. 6 is a flow diagram 600 depicting a procedure in an example implementation of identifying memory system sensitivity to timing parameters. The flow diagram 600 is performed by a system such as system 100 of FIG. 1, system 200 of FIG. 2, system 300 of FIG. 3, system 400 of FIG. 4, or system 500 of FIG. 5.

In this example, a memory request targeting a virtual address is received (block 602). Examples of such memory requests include store requests and load requests.

The virtual address is translated to a physical address (block 604). This translation is performed, for example, using a TLB hierarchy, and includes accessing a TLB and optionally performing a page walk.

A cache is accessed based on whether the translation resulted in a TLB miss (block 606). The cache is, for example, one or more caches (e.g., one or more cache levels) within a cache system. In one or more implementations, accessing the cache includes bypassing, in response to the translation lookaside buffer miss, the cache when retrieving data or an instruction from the physical address or storing the data or the instruction to the physical address (block 608). Additionally or alternatively, accessing the cache includes both checking whether an instruction or data corresponding to the memory request is stored in the cache (block 610), and speculatively sending the memory request to a next level cache (block 612).

The various functional units illustrated in the figures and/or described herein (including, where appropriate, the CPU pipeline 102, the TLB hierarchy 104, the cache system 106, and the system memory 108) are implemented in any of a variety of different manners such as hardware circuitry, software executing or firmware executing on a programmable processor, or any combination of two or more of hardware, software, and firmware. The methods provided are implemented in any of a variety of devices, such as a general purpose computer, a processor, or a processor core. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A method comprising:
   receiving a memory request targeting a virtual address;
   in response to a translation lookaside buffer miss, translating the virtual address to a physical address via a page walk; and
   in response to a translation response indicating the translation lookaside buffer miss, bypassing a first level of a cache, accessing a second level of the cache, and allocating a miss status handling register at the first level of the cache.

2. The method of claim 1, wherein the bypassing is further in response to a determination that there is less than a threshold chance that data or instructions associated with the physical address are in the first level of the cache.

3. The method of claim 1, wherein:
   the first level of the cache comprises a level 1 cache; and
   the second level of the cache comprises a level 2 cache.

4. The method of claim 1, wherein:
   the first level of the cache comprises a level 1 cache and a level 2; and
   the second level of the cache comprises a level 3 cache and is accessed based on a size of one or more pages to which the physical address corresponds.

5. The method of claim 4, wherein accessing the level 3 cache comprises checking whether the physical address is present in a level 3 shadow tag macro.

6. The method of claim 1, further comprising:
   transmitting, to a cache controller corresponding to the cache and in response to the translation response indicating the translation lookaside buffer miss, a memory request having a long-latency bit set to indicate to bypass the first level of the cache.

7. A device, comprising:
   a cache;
   a translation lookaside buffer;
   a translation lookaside buffer controller to translate a virtual address targeted by a memory request to a physical address via a page walk in response to a translation lookaside buffer miss; and
   a cache controller to receive the memory request and, in response to a translation response indicating the translation lookaside buffer miss, bypass the cache based on the translation lookaside buffer miss and allocate a miss status handling register at the cache.

8. The device of claim 7, wherein to bypass the cache further comprises to bypass, based on a size of one or more pages to which the physical address corresponds, one or more cache levels of the cache.

9. The device of claim 7, wherein the cache comprises a level 1 cache and wherein to bypass the cache further comprises to bypass, in response to the translation lookaside buffer miss, a level 2 cache when retrieving data or instruction from the physical address or storing the data or the instruction to the physical address in response to a determination that there is less than a threshold chance that the data or the instructions associated with the physical address are in the level 1 cache.

10. The device of claim 9, wherein to bypass the cache further comprises to bypass, in response to the translation lookaside buffer miss, a level 3 cache when retrieving the data or the instruction from the physical address or storing the data or the instruction to the physical address.

11. The device of claim 7, wherein the cache comprises a level 1 cache and wherein to bypass the cache comprises to, in response to the translation lookaside buffer miss:
   check whether an instruction or data corresponding to the memory request is stored in a level 2 cache; and
   speculatively send the memory request to a level 3 cache.

12. The device of claim 7, wherein the memory request includes a long-latency bit set to indicate to bypass the cache.

13. The device of claim 7, wherein:
   the device comprises a computing device,
   the computing device further comprises a system memory; and
   to bypass the cache comprises to, in response to the translation lookaside buffer miss, access the system memory.

14. A device, comprising:
   a translation lookaside buffer;

a translation lookaside buffer controller to translate a virtual address targeted by a memory request to a physical address via a page walk in response to a translation lookaside buffer miss; and a cache system, including at least one cache, to receive the memory request and, in response to a translation response indicating the translation lookaside buffer miss for the virtual address, access the at least one cache based on the translation lookaside buffer miss and allocate a miss status handling register at the at least one cache.

15. The device of claim 14, wherein to access the at least one cache comprises to bypass, in response to the translation lookaside buffer miss, the at least one cache when retrieving data or an instruction from the physical address or storing the data or the instruction to the physical address based on a size of one or more pages to which the physical address corresponds.

16. The device of claim 15, wherein the at least one cache comprises a level 1 cache and wherein to access the at least one cache further comprises to bypass, in response to the translation lookaside buffer miss, a level 2 cache when retrieving the data or the instruction from the physical address or storing the data or the instruction to the physical address.

17. The device of claim 16, wherein to access the at least one cache further comprises to bypass, in response to the translation lookaside buffer miss, a level 3 cache when retrieving the data or the instruction from the physical address or storing the data or the instruction to the physical address in response to a determination that there is less than a threshold chance that the data or the instructions associated with the physical address are in the level 1 cache.

18. The device of claim 14, wherein the at least one cache comprises a level 1 cache and wherein to access the at least one cache comprises to, in response to the translation lookaside buffer miss:
    check whether an instruction or data corresponding to the memory request is stored in the level 1 cache; and
    speculatively send the memory request to a level 2 cache.

19. The device of claim 14, wherein the at least one cache comprises a level 2 cache and wherein to access the at least one cache comprises to, in response to the translation lookaside buffer miss:
    check whether an instruction or data corresponding to the memory request is stored in the level 2 cache; and
    speculatively send the memory request to a level 3 cache.

20. The device of claim 14, wherein the memory request includes a long-latency bit set to indicate to bypass the at least one cache.

* * * * *